May 3, 1966 R. K. DAKER ETAL 3,248,808
ANSWER RECORDERS
Filed Sept. 23, 1963

INVENTORS
ROBERT K. DAKER and
CHARLES W. FREEBURN
BY
ATTORNEY

United States Patent Office 3,248,808
Patented May 3, 1966

3,248,808
ANSWER RECORDERS
Robert K. Daker, 16 E. 96th St., New York, N.Y., and Charles W. Freeburn, 15 Hart Place, Nyack, N.Y.
Filed Sept. 23, 1963, Ser. No. 310,532
8 Claims. (Cl. 35—48)

This invention relates generally to devices for recording the answers to questions of the multiple choice or true-false type.

In auto-instructional or teaching systems, the student or learner is assigned a chapter in a text, a section of a manual, a map or other appropriate existing unit of factual presentation, or he is given specially prepared material organized in logical units or one or two short paragraphs or sentences, and the learner's understanding and retention of the facts or information thus presented are tested by multiple-choice questions included in materials separate from the factual presentation or interposed between the units of the latter. Electronic or computer-based "teaching machines" have been developed for recording the answers to such questions and either confirming correct answers or, in the case of wrong answers, referring the learner back to pertinent portions of the original factual presentation, or to further explanation and retesting so that assimilation of the information contained in the instructional material is ensured. It is apparent that electronic or computer-based "teaching machines" capable of functioning in the indicated manner are relatively complex and costly devices and thus cannot enjoy widespread use, particularly in connection with home study or correspondence courses.

Numerous answer sheets of answer recording devices have been provided, for example, as disclosed in United States Letters Patent No. 1,883,775, No. 2,551,083 and No. 3,086,300, for recording the selected answers to multiple-choice type questions. These patented answer sheets or recording devices include means, not observable by the student, for indicating correct and wrong answers, thereby to facilitate marking of the test or examination, and further for disclosing instances where the original choice has been changed or altered, so as to render the answer sheet or recording device substantially "cheatproof." However, such existing answer sheets or recording devices are not useful in connection with auto-instructional systems of the kind described above in that they can only record the selected answers to the questions, but cannot indicate to the learner whether the answer is correct or wrong, and further cannot provide reference to pertinent portions of the information presentation in the event of wrong answers or controlled access to further information in the event of correct answers.

In view of the described limitations inherent in answer sheets of the type disclosed in the above identified patents, it has been further proposed to provide an answer sheet having defined areas corresponding to the several possible answers to multiple-choice questions and having printed therein, in indelible ink, letters, symbols, numerals or other indicia, for example, for either confirming a correct answer or for indicating the pertinent portions of the associated factual presentation to be reviewed in the case of wrong answers. The indelibly printed indicia are initially covered or hidden by chemically erasable screening layers or masks. In using such an answer recording device, the student or learner indicates the selected answer by erasing the screening layer or mask from the corresponding area of the answer sheet. A fountain-type brush or pen dispensing the necessary liquid chemical is used as the necessary tool for erasing the mask from the selected area, thereby to uncover the underlying indicia. Such an arrangement is obviously disadvantageous in that the erasing tool required for use in connection with the answer sheet is not generally available, and in that the liquid chemical used for the erasing function is usually a bleach which can damage the user's clothes. Further, the liquid chemical does not operate immediately to erase the mask or shield and thereby expose the underlying indicia, and therefore annoyingly long periods of time are required for recording answers and gaining controlled access to the information embodied in the uncovered indicia. The chemical erasing of the masking or shielding layers also results in smearing of the answer sheet so that the appearance of the latter is undesirably messy.

Accordingly, it is an object of the invention to provide an answer recorder which avoids the above disadvantages in that the selected answers are recorded through the use of a common, and hence readily available pencil on an answer sheet, and the act of recording the selected answer automatically develops the image of letters, numerals, symbols or other indicia on the answer sheet, which indicia may confirm a correct answer or refer the student or learner to the associated factual presentation either for further explanation, in the event of wrong answer, or for access to additional information or facts, in the event of a correct answer.

In accordance with an aspect of this invention, an answer recorder comprises a top answer sheet having defined areas corresponding to predetermined answers, and an embossed sheet underlying the answer sheet and having indicia defining areas registering with the corresponding areas of the answer sheet so that, when an area of the answer sheet is shaded with a common lead pencil to indicate the selected answer to a multiple-choice question, an image of the indicia defined by the corresponding area of the embossed sheet is developed within the shaded area.

In a preferred embodiment of the invention, the answer recorder further comprises pressure sensitive sheet means interposed between the answer sheet and the embossed sheet so that, when an area of the answer sheet is shaded with a pencil, the pressure of the pencil causes the pressure sensitive sheet means to produce an ineradicable indication at a location corresponding to that of the shaded area of the answer sheet. The pressure sensitive sheet means is preferably sealed between the answer sheet and the embossed sheet, for example, by forming the answer sheet as the front of a sealed envelop containing the embossed sheet and the pressure sensitive sheet means, thereby to prevent tampering with the indications provided by the latter. The indications provided by the pressure sensitive sheet means render the answer recorder substantially "cheat-proof" in that the successive shading and erasing of two or more of the areas of the answer sheet in an attempt to empirically locate the correct answer to a question will be evidenced by the corresponding ineradicable indications of the pressure sensitive sheet means.

The above, and other objects, features and advantages of the invention, will be apparent in the following detailed description of illustrative embodiments thereof which is to be read in connection with the accompanying drawing forming a part hereof, and wherein.

Figure 1:
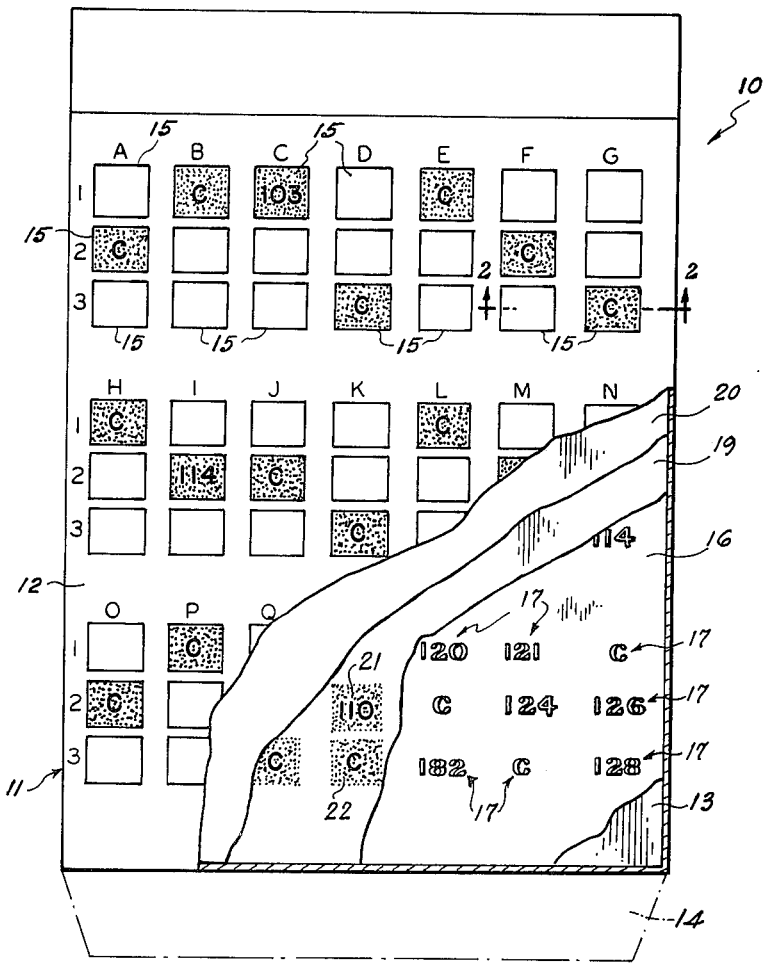
FIG. 1 is a plan view, partly broken away, of an answer recorder embodying this invention.

Referring to the drawing in detail, and initially to FIG. 1 thereof, it will be seen that an answer recorder embodying the invention, and there generally identified by the numeral 10, comprises a paper envelope 11 of rectangular configuration having its front 12 and back 13 integrally joined along three sides, while the remaining side of the front 12 has a gummed flap 14 (shown in broken lines on FIG. 1) adapted to be folded and adhesively secured to back 13 for closing the envelope.

The front 12 of envelope 11 forms an answer sheet and is printed to define areas 15 which are to be selectively rubbed or shaded with a common or ordinary lead pencil for indicating the selected answers to multiple choice questions. The areas 15 may be arranged in columns under suitable indicia, for example, the letters "A," "B," "C" . . . identifying the several questions to be answered, with each column having a number of areas 15 therein corresponding to the number of possible answers given for each question and being suitably identified, for example, by the numerals "1," "2" and "3."

The answer recorder 10 further comprises an embossed sheet or matrix 16 sealed within the envelope 11 and dimensioned so as to have a minimum play within the latter. The embossed sheet 16 has indicia defining areas 17 registering with the areas 15 of the answer sheet 12 when sheet 16 is positioned within the envelope. In the embodiment of the invention illustrated on FIGS. 1, 2, 3 and 4, each indicia defining area 17 of embossed sheet 16 has one or more raised portions 18 extending from the surface thereof facing toward the answer sheet 12 to define a numeral, as shown on FIG. 4, letter, symbol or other indicia. Thus, when an area 15 of answer sheet 12 is rubbed or shaded with a pencil, the raised indicia defining portions 18 of the corresponding area 17 of embossed sheet 16 causes a relatively dark image of the defined indicia to be developed within the shaded area of the answer sheet. For example, as shown on FIG. 1, when the area 15 of answer sheet 12 identified at "A-2" is shaded with a pencil, a relatively dark image of the letter "C" is developed within such area by reason of the fact that the corresponding area 17 of embossed sheet 16 has a raised portion in the shape of the letter "C." Still further by way of example, when the area 15 of the answer sheet identified at "C-1" is shaded, there is developed within the shaded area a relatively dark image of the numeral "103" by reason of the fact that the underlying or registered area 17 of the embossed sheet 16 has raised portions in the form of the numeral "103."

Figures 4, 5:
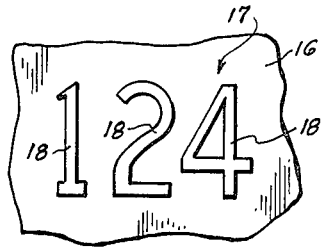
FIG. 4 is an enlarged detail view of one of the indicia defining areas provided on the embossed sheet included in the answer recorder of FIG. 1.
FIG. 5 is a view similar to that of FIG. 4, but showing an indicia defining area of a modified form of embossed sheet.

Although it is preferred to have the indicia defining areas 17 of embossed sheet 16 formed with raised portions 18 in the form of numerals, letters or symbols so that a relatively dark image thereof is developed within the shaded area of the answer sheet, as described above, in a modification of the answer recorder embodying this invention, the embossed sheet, as indicated at 16a on FIG. 5, has indicia defining areas 17a with rough or stippled surfaces within which there are depressed, smooth portions 18a in the form of the desired indicia. When the embossed sheet 16a is incorporated in the answer recorder 10 in place of the embossed sheet 16, shading or rubbing with a pencil of a selected area 15 of answer sheet 12 causes a relatively light image of the indicia defined by the smooth depressed portions 18a of the corresponding area 17a to be developed within the relatively darker shaded area.

The answer recorder 10 is ideally suited for use in connection with auto-instructional systems based on either adjunct programming or intrinsic programming. In a system employing adjunct programming, the learner is assigned a chapter in a text, a section of a manual, a map or other appropriate existing factual or informational presentation, and his understanding and retention thereof are tested by multiple-choice questions. If the answers to such questions, as recorded on answer sheet 12 by shading of the appropriate areas 15, are correct, that fact is confirmed by the image developed in the shaded areas, for example, by the letters "C" appearing in the shaded areas identified as "A-2," "B-1" and "D-3." However, if the selected answer is wrong, the image developed by shading the area 15 corresponding to the wrong answer refers the learner back to pertinent portions of the original factual presentation. Thus, for example, shading of the area 15 identified as "C-1" causes an image of the numeral "103" to appear therein, and such numeral refers the learner or student back to the correspondingly numbered page, paragraph or section of the associated text, manual or other factual presentation for further explanation intended to correct his original erroneous understanding or to fortify his retention of the presented facts or information.

Where the answer recorder 10 is intended for use in an auto-instructional system employing intrinsic programming, the learner is given specially prepared material organized in logical, suitably numbered units of one or two short paragraphs followed by a multiple-choice question for testing the understanding and retention of the information presented in each unit. The order of the units within the specially prepared material is usually scrambled so as to discourage any attempt to proceed through the units in succession. When employed with such intrinsically programmed material, the shading of an area 15 of answer sheet 12 corresponding to a correct answer to a multiple-choice question develops therein an image of a number or other indicia referring the learner to the next logical unit of the specially prepared material, whereas the shading of an area 15 of the answer sheet corresponding to a wrong answer develops the image of a number or other indicia referring the learner to a unit containing further explanation and retesting so as to ensure correct understanding and retention of each unit of information before the learner is afforded access to further units of information.

It is also to be understood that the answer recorder 10 may be employed in connection with auto-instructional systems employing linear programming and in which the learner is given specially prepared material organized in very small steps, usually one or two sentences called "frames." The learner responds to each frame of the specially prepared material by filling in a blank or several blanks with a contextual word or words selected from multiple-choices. The selection of a word or words is recorded on answer sheet 12 by shading of the appropriate area 15 thereof, and the image of the indicia thereby developed within the shaded area either verifies the correctness of the selection or identifies the correct word or words in the event of a wrong answer, whereupon the learner moves on to the next "frame."

The images of indicia developed by shading of selected areas 15 of answer sheet 12 may directly refer to the associated factual or informational presentation with which the answer recorder is associated, as described above, in which case, a specially prepared embossed sheet 16 is required for each instructional program. However, it should be understood that the indicia defined by the areas 17 of the embossed sheet 16 may merely represent elements of a key or code which is also printed on the answer sheet 12 and which relates each indicia of the key or code to the associated factual or informational presentation. In the latter case, a uniform embossed sheet 16 can be used in connection with numerous instructional programs for which individual printed envelopes 11 are merely provided, thereby obviously reducing the cost of the answer recorder.

The embossed sheet 16 or 16a incorporated in the answer recorder 10 may be formed of compressed paper or cardboard, for example, similar to that used for printing matrices, or it may be formed of a suitably molded plastic sheet. Further, it will be apparent that the embossed sheet 16 or 16a is not marred, or otherwise affected by the shading of the areas 15 on answer sheet 12 so that, following the use of an answer recorder 10, the embossed sheet 16 or 16a may be removed from the envelope 11 and inserted in a new envelope, thereby permitting the reuse of the embossed sheet.

In order to render the answer recorder 10 substantially "cheat-proof," that is, to prevent the undetected shading of more than one of the areas 15 corresponding to each question so as to locate the indicia defining the correct answer and then erasure of the shading from those areas corresponding to wrong answers, the answer recorder 10 further preferably includes pressure sensitive sheet means interposed between the answer sheet 12 and the embossed sheet 16 or 16a, and also sealed within the envelope 11 to provide ineradicable indications at those locations at which areas 15 of the answer sheet have been shaded.

Figure 2:
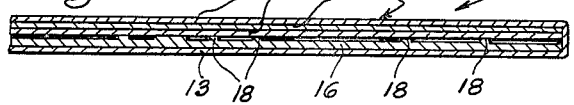
FIG. 2 is an enlarged, fragmentary sectional view taken along the line 2—2 on FIG. 1.

In the answer recorder 10 of FIGS. 1 and 2, the pressure sensitive sheet means consist of a carbon set made up of a plain sheet 19, preferably of thin or tissue paper, and a sheet 20 of carbon paper having carbon on the surface thereof confronting the sheet 19. If desired, the sheets 19 and 20 may be adhesively or otherwise separably secured together along one edge so as to facilitate the simultaneous insertion of both sheets in the envelope 11. With the above described arrangement of FIGS. 1 and 2, the pressure of a pencil applied to the answer sheet 12 in shading of a selected area 15 of the latter effects transfer of carbon from sheet 20 to the underlying surface of sheet 19. Thus, if two or more of the areas 15 representing answers to a single question are shaded, carbon copies of the shaded areas are transferred to the corresponding locations on sheet 19, for example, as at 21 and 22 on FIG. 1. Thereafter, even if the shading of one of the areas 15 on the answer sheet 12 is erased, for example, in an attempt to make it appear that only the correct answer was selected, both carbon copies 21 and 22 of the originally shaded areas will remain on sheet 19. By reason of the sealing of the latter within envelope 11, such indications on sheet 19 are ineradicable without destruction of the envelope.

In addition to rendering the answer recorder 10 substantially "cheat-proof," the sheet 19 thereof provides a carbon copy of the answer sheet which can be separated from the latter and conveniently utilized in evaluating the effectiveness of the auto-instructional system of which the answer recorder is a part.

Figure 3:
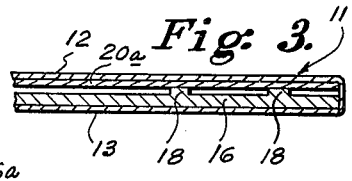
FIG. 3 is a sectional view similar to that of FIG. 2, but showing another embodiment of the invention.

If desired, the sheet 20 of carbon paper may be replaced by spots of carbon applied to the underside of answer sheet 12.

Where it is not necessary to provide a carbon copy of the answer sheet 12 separable from the latter, the sheet 19 may be eliminated and the sheet of carbon paper, indicated at 20a on FIG. 3, is then interposed between the embossed sheet 16 and the answer sheet 12 with the carbon coated surface of the sheet 20a facing toward the undersurface of answer sheet 12. Thus, when areas 15 of answer sheet 12 are shaded, the pressure of the pencil used for that purpose causes the transfer of carbon from sheet 20a to the underside of the answer sheet 12 for providing indications of the areas that have been shaded, which indications are ineradicable without destroying the envelope 11.

Further, if desired, the tissue sheet 19 and carbon sheet 20 may be replaced by a single sheet of recording paper of the type available commercially from the National Cash Register Company, under the designation "NCR," from Waxon-Carboff, Inc. of Rochester, New York, under the designation "Waxon," or from Minnesota Mining and Manufacturing, under the designation "Action" paper. Such paper normally has a plain white or tinted surface on which blue, purple or other indications appear along the lines where pressure is applied to the paper, and thus may form the pressure sensitive sheet means of answer recorder 10.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. An answer recorder comprising an envelope which, at one face thereof, constitutes a top answer sheet having defined areas corresponding to predetermined answers and intended to be shaded with a pencil for indicating selected answers, an embossed sheet enclosed by said envelope and underlying said answer sheet, said embossed sheet having indicia defining areas registering with said areas of the answer sheet so that the shading of an area of the answer sheet develops an image thereon of the corresponding indicia, and pressure sensitive sheet means also enclosed by said envelope and being interposed between said answer sheet and embossed sheet to provide ineradicable indications at the locations of the shaded areas of the answer sheet, which ineradicable indications cannot be tampered with by reason of the enclosure of said pressure senstitive sheet means in said envelope.

2. An answer recorder as in claim 1; wherein said pressure sensitive sheet means includes a sheet of carbon paper and a confronting sheet to which carbon is transferred by the pressure of the pencil in the shading areas of the answer sheet.

3. An answer recorder as in claim 1; wherein said pressure sensitive sheet means consist of a sheet of carbon paper having its operative surface confronting the underside of said answer sheet to transfer carbon to the latter for providing said indications.

4. An answer recorder as in claim 1; wherein said pressure sensitive sheet means is of the type developing visible markings thereon at the regions where pressure is exerted by a pencil in shading said areas of the answer sheet.

5. An answer recorder as in claim 1; wherein said embossed sheet is of impressed paper.

6. An answer recorder as in claim 1; wherein said embossed sheet is of a plastic resin.

7. An answer recorder as in claim 1; wherein said embossed sheet has raised portions corresponding to said indicia so that said image developed on the answer sheet appears as a dark symbol within the shaded area.

8. An answer recorder as in claim 1; wherein said areas of the embossed sheet are stippled and said indicia are defined as smooth depressed regions within said stippled areas so that said image developed on the answer sheet appears as a relatively light symbol within the shaded area.

References Cited by the Examiner

UNITED STATES PATENTS

| | | | |
|---|---|---|---|
| 1,129,573 | 2/1915 | Johnson | 101—1 |
| 1,705,657 | 3/1929 | Clapp et al. | 35—48.1 |
| 1,883,775 | 10/1932 | Finkenbinder | 35—48.1 |
| 2,026,115 | 12/1935 | Anthony | 101—274 |
| 3,086,300 | 4/1963 | Rugland et al. | 35—9 X |
| 3,104,799 | 9/1963 | Steidinger | 282—25 |

EUGENE R. CAPOZIO, *Primary Examiner.*

SHELDON BENDER, *Assistant Examiner.*